United States Patent [19]
Linnersten et al.

[11] Patent Number: 5,226,937
[45] Date of Patent: Jul. 13, 1993

[54] VOID-CONTAINING SORBENT PAD

[75] Inventors: Staffan B. Linnersten, New Port Richey, Fla.; Donald H. White, Jr., Homer, N.Y.

[73] Assignee: Pall Corporation, East Hills, N.Y.

[21] Appl. No.: 794,852

[22] Filed: Nov. 21, 1991

Related U.S. Application Data

[63] Continuation of Ser. No. 690,320, Apr. 26, 1991, abandoned, which is a continuation of Ser. No. 395,669, Aug. 18, 1989, abandoned.

[51] Int. Cl.$^5$ ................... B01D 53/04; B01D 27/10
[52] U.S. Cl. ................................... 55/274; 55/316; 55/387; 55/DIG. 42
[58] Field of Search ................. 55/274, 275, 316, 387, 55/389, DIG. 42

[56] References Cited

U.S. PATENT DOCUMENTS

| | | | |
|---|---|---|---|
| 2,063,990 | 12/1936 | Dym | 55/316 |
| 2,548,168 | 4/1951 | Luce | 55/387 X |
| 2,764,251 | 9/1956 | Jessop | 55/316 |
| 3,306,011 | 2/1967 | Dvorkin | 55/275 |
| 3,352,091 | 11/1967 | Dvorkin | 55/274 |
| 3,381,454 | 5/1968 | Sponsel et al. | 55/528 |
| 3,758,996 | 9/1973 | Bowser | 55/389 X |
| 3,791,910 | 2/1974 | Bowser | 55/389 X |
| 3,865,758 | 2/1975 | Yoshida et al. | 55/389 X |
| 3,925,248 | 12/1975 | Moroni et al. | 55/387 X |
| 4,013,566 | 3/1977 | Taylor | 55/387 X |
| 4,016,080 | 4/1977 | Williams | 55/316 X |
| 4,046,939 | 9/1977 | Hart | 55/387 X |
| 4,058,362 | 11/1977 | Sinclair | 55/387 X |
| 4,128,513 | 12/1978 | Errede et al. | 521/50 |
| 4,234,326 | 11/1980 | Bailey et al. | 55/387 X |
| 4,239,516 | 12/1980 | Klein | 55/389 |
| 4,342,811 | 8/1982 | Lopatin et al. | 428/220 |
| 4,381,929 | 5/1983 | Mizuno et al. | 55/316 |
| 4,383,956 | 5/1983 | Croft et al. | 264/49 |
| 4,645,519 | 2/1987 | Fraioli et al. | 55/389 X |
| 4,668,258 | 5/1987 | Steer | 55/387 |
| 4,684,380 | 8/1987 | Leichnitz | 55/387 X |
| 4,684,382 | 8/1987 | Abu-Isa | 55/387 X |
| 4,724,242 | 2/1988 | Vassileff | 55/387 X |
| 4,800,190 | 1/1989 | Smolik | 55/316 X |
| 4,806,134 | 2/1989 | Lhota | 55/387 X |
| 4,864,382 | 8/1989 | Abu-Isa | 55/316 |

FOREIGN PATENT DOCUMENTS

| | | |
|---|---|---|
| 897530 | 12/1983 | Belgium . |
| 2747604 | 4/1979 | Fed. Rep. of Germany . |
| 3719233 | 12/1988 | Fed. Rep. of Germany . |
| 2199479 | 4/1974 | France . |
| 63-283719 | 11/1988 | Japan .................. 55/316 |
| 2148740 | 6/1985 | United Kingdom . |

*Primary Examiner*—Robert Spitzer
*Attorney, Agent, or Firm*—Leydig, Voit & Mayer

[57] ABSTRACT

An air filtration device for removing undesirable gaseous components of an air flow comprises a pad of a sorbent material having disposed therein a plurality of zones of an open-celled foam. The provision of these zones decreases the pressure drop across the pad and prolongs the useful life of the pad.

12 Claims, 1 Drawing Sheet

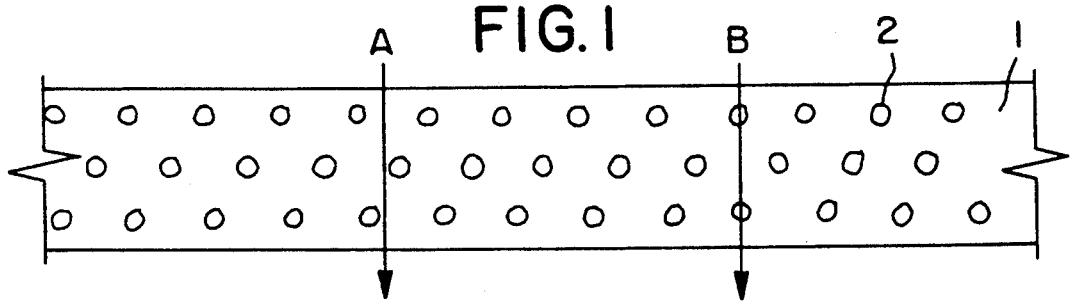
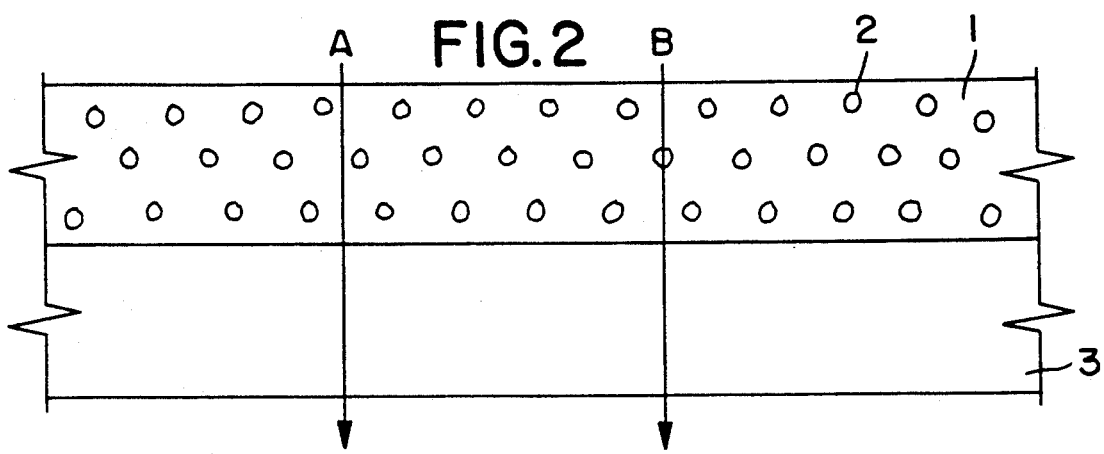
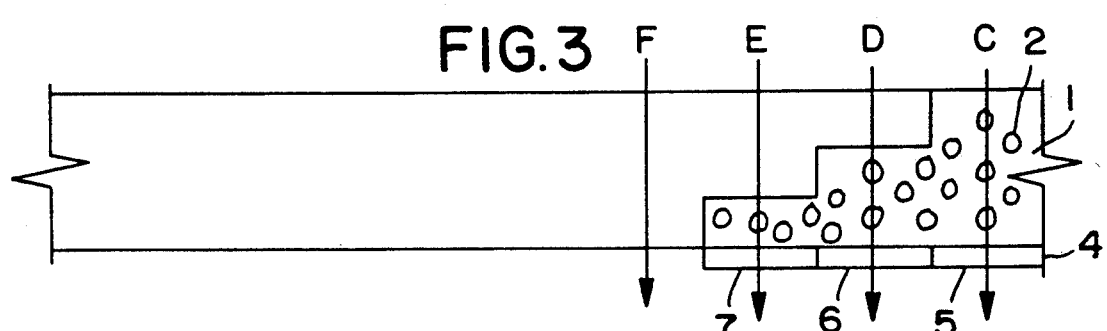
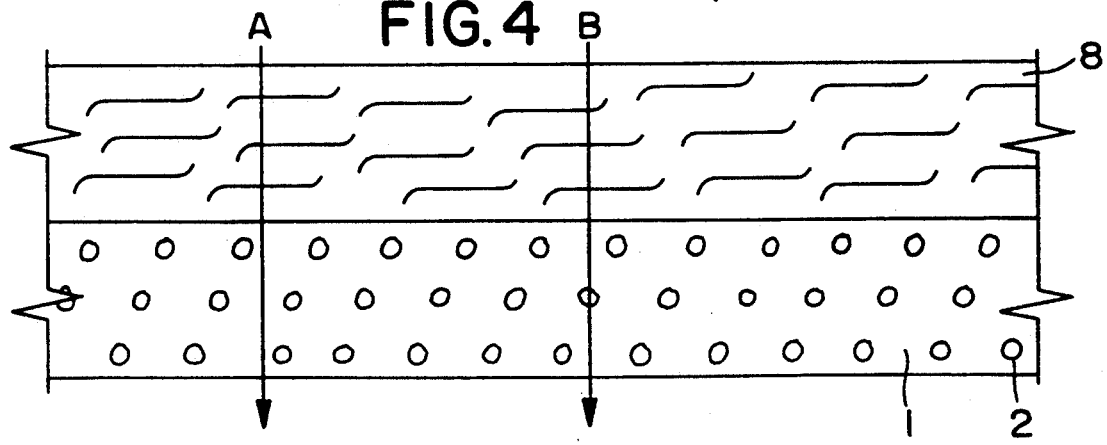

VOID-CONTAINING SORBENT PAD

This application is a continuation of U.S. patent application Ser. No. 07/690,320 filed Apr. 26, 1991, now abandoned, which is a continuation of U.S. patent application Ser. No. 07/395,669, filed Aug. 18, 1989, now abandoned.

BACKGROUND OF THE INVENTION

This invention relates to air filtration devices and specifically to those whose objective is to remove certain gaseous components from an air flow. It is well-known that, in any space having a recycled air system, it is highly desirable to filter the recycled air to remove particulate matter. Some filtration devices are so effective that they are also capable of removing aerosol droplets such as are significant components of tobacco smoke. However, some air contaminants are gaseous in nature and are not easily removed by filters that rely on interception or entrapment of particulates carried by the air. This problem is particularly acute in closed environments such as airplanes, where the recycling of air containing offensive odors is not calculated to produce contented passengers. It is also of vital concern where it is desired to intercept truly noxious gases, as in chemical warfare situations or in areas where poisonous gases have been accidentally vented. On a less critical level, it is often desirable to reduce the moisture or carbon dioxide content of an air flow.

It is known that some materials are highly effective at removing undesirable, (defined herein to include toxic, noxious, offensive, or otherwise unwanted), gases and it has been proposed that recycled filtered air also be passed through a pad of one of these materials before completing the recycle operation. Problems, however, occur when the sorbent material is saturated and gas "breakthrough" occurs. From a flow free from the undesirable gas, the change to an undesirable level of contamination is swift and dramatic because the air flow is, by design, equal through all parts of the pad so far as can be arranged. Thus, breakthrough occurs at all points essentially simultaneously. Since it is not easy to predict or measure the approach of breakthrough, it is necessary to have excessively frequent pad changes or risk breakthrough occurring at an inconvenient or dangerous time.

Another problem with the use of sorbent beds of the prior art is that they usually result in quite a severe pressure drop across the pad. Thus, it is necessary to provide more powerful air circulation fans which, beside needing more power, tend to be noisier and often more bulky. These are serious issues when the system is used, for example, in an aircraft cabin air recycling system.

DESCRIPTION OF THE INVENTION

A sorbent bed has now been designed that is capable of minimizing the problems of sudden breakthrough and, at the same time, provides a pad with a significantly lower pressure drop across the pad. In addition, the pads have an extended service life when used in a recycled air application.

The pad sorbs undesirable gases when air containing the undesirable gas flows through the pad from a first surface to a second surface, the separation between these surfaces being referred to as the thickness of the pad.

The pad of the invention comprises a sorbent material and dispersed within said sorbent material a plurality of spaced zones of an open celled foam that together occupy from about one-eighth to about one-half, and preferably about one-quarter, of the local thickness of the pad along a line in the direction of air flow.

The sorbent material that is most frequently used is sorbent carbon but other forms of carbon such as, for example, charcoal, activated carbon, and the like can be used. Other sorbent materials that have been shown to be effective in such applications include activated silica, activated alumina, certain zeolites, and artificial zeolites.

The sorbent material may often be impregnated with an oxidizing agent such as potassium permanganate or a caustic alkali such as sodium hydroxide. The purpose of such impregnants is to change an undesirable gas chemically into something that is acceptable while it is sorbed on the surface of the sorbent.

Sorption is well-known to be a surface phenomenon so whatever the material chosen, it is important that it have a very large surface area exposed to the gas and at the same time the ability to retain the gas. Any material having these characteristics can be used as the sorbent material in the sorption pad.

Dispersed within the sorbent pad is a plurality of zones of an open celled foam. These zones provide pathways through the pad along which some of the air can move with greater velocity. Provision of such zones significantly diminishes the pressure drop over the pad as a whole. The zones can occupy from about 10 to about 50% of the total volume of the sorbent pad but preferably they provide from about 20 to about 30% of the total volume. The dispersion of the zones is often random throughout the pad though it is sometimes preferable to design their distribution such that a proportion of the gas passing through the pad, for example, from about 30 to about 60% and preferably from about 40 to about 50%, passes along a path that includes traversal of one or more of the zones. In this way a proportion of the gas passing through the pad will travel through a smaller amount of sorbent material and that amount will become saturated before the sorbent in the rest of the pad. As a result, there will be an early warning of depletion of the pad and this, of course, is another advantage of the present invention.

Because, as indicated above, some of the gas traverses the pad relatively rapidly, there will be a corresponding reduction in the overall pressure drop across the pad, by comparison with a homogeneous pad of the same dimensions and sorbent. In addition, if the air is recycled, as in an aircraft cabin air filtration system, any undesirable gas breaking through will be at least in part sorbed in the next cycle and the service life of the sorbent pad will be thereby extended.

The material occupying the dispersed zones in the sorbent pad is described as an open-celled foam material. In fact, however, this need not be a classical foam in the sense of presenting a relatively rigid matrix structure defining a plurality of interconnected, open cells. The term "foam", as used in the present invention, is intended to imply an essentially air-filled zone defined by rigid boundaries through which air can pass freely. Thus, the foam zone can comprise any rigid, air-permeable, hollow body. Since the body must be air permeable, it is obviously essential that the pores in the shell be smaller than the particles of the sorbent material; otherwise, this material would flow into the hollow shell and fill it.

The foam zones can have any desirable shape such as spheres, cylinders, tubes, squares, or irregular shapes. The preferred foam zone shape, however, is spherical.

In one particular embodiment of the invention, one part of a sorbent pad, for example, one corner segment, is provided with portions in which the number of zones within the thickness of the pad varies. Thus, one portion may contain sufficient zones such that 20% of the thickness is provided by the zones; another portion in which 40% of the thickness is provided by the zones; and a third portion in which 60% of the thickness is provided by the zones. This area of the sorbent pad is provided further with an indicator device indicating, perhaps by a color change, when breakthrough of the undesirable gas occurs. In this way, progress of the depletion of the rest of the bed can be followed.

The matrix material of the foam can be a polymer such as polystyrene, a styrene/acrylonitrile copolymer, polyurethane, polyvinyl chloride, a polyolefin, an olefin copolymer, and the like; or it can be a refractory foam, such as a metallic or ceramic foam, especially if high temperatures are anticipated. For normal air filter applications, such as aircraft cabin air filtration, a polymer foam such as a styrene/acrylonitrile copolymer, neoprene foam, or polyurethane foam is preferred.

While it is not essential that the foam be 100% open celled (i.e., containing no closed cells), it is preferred that it be at least 75% open celled to provide the advantages of the present invention.

DESCRIPTION OF PREFERRED EMBODIMENTS

The invention is now further described with specific reference to FIGS. 1-4 which each represent a different embodiment of the invention in schematic cross-section. In each drawing, a sorbent pad 1 is provided with voids 2 dispersed randomly through the thickness of the pad.

In each figure, path A illustrates a low velocity path through the pad and path B represents a high velocity pathway through the pad. This is because path B intersects one or more of the foam zones within the thickness of the pad. Since the zone is formed of an open celled foam, air is able to pass very much more quickly than along a path through only the sorbent material.

FIG. 1 illustrates the basic concept of the invention in which zones 2 are dispersed randomly throughout the whole thickness of the pad 1.

In FIG. 2 a zone-containing pad 1 is combined with a pad 3 of the same or different sorbent material containing no zones. This second pad may be adapted to sorb a different gas than that sorbed in the zone-containing layer.

In FIG. 3 the concept of the invention is used to provide an indication of the degree of depletion of a sorbent pad. The zone-containing pad 1 is shown as an end portion of a non-zone-containing pad. In this case there will be four flow paths, labelled C, D, E, and F, through the pad with path C being the fastest and path F the slowest. Located over the exit portions of flow paths C, D, and E is an indicator layer 4 which changes color when the undesirable gas to be sorbed breaks through. Thus, it can be appreciated that section 5 of layer 4 will change color first, after perhaps one-quarter depletion, section 6 will change color after perhaps one-half depletion, and section 7 will change color after three-quarters depletion of the sorbent pad. In FIG. 3, the zone-containing portion of the pad is located at one end of the pad but, of course, it is possible that the same stepped configuration could extend all the way across the full width of the pad.

In FIG. 4, the zone-containing pad 1 is combined with a particulate filter 8 so as to provide a complete filtration system that can be accommodated within the same housing.

In most situations it will be convenient for the sorbent pad to be located physically adjacent to a particulate filter. In this event, it is convenient to seal both components into a common housing with provision made to avoid leakage of air around the edges of the pad, thereby avoiding passage through the sorbent bed.

Since the sorbent bed is often made of a finely divided material, it is usually necessary in such embodiments to provide containment means for the particulate material. In a preferred embodiment, this means comprises a fine metal mesh covered with nonwoven spun-bonded web of nylon filaments. The purpose of this means, however, is merely to contain the sorbent material and the foam zones without giving rise to a significant increase in the pressure drop across the filter. Therefore, any means securing this end can be substituted. One such means, for example, might be the provision of an internal support structure by causing mutual adhesion of the particles of the sorbent material, or by compressing the particulate material into a coherent solid. These expedients, however, often tend to decrease the porosity of the sorbent bed and, therefore, increase the pressure drop across it. As has been indicated above, this is not usually considered to be an advantage in the usual applications to which this sorbent bed of the present invention is directed.

The embodiments described above are intended for the purposes of illustration only and are intended to convey no inherent limitation on the essential scope of the invention.

We claim:

1. A sorbent pad having opposed inflow and outflow surfaces, said pad comprising a sorbent material and dispersed within said sorbent material a plurality of zones of an open celled foam that together occupy from one-eighth to one-half of the local thickness of the pad between said inflow and outflow surfaces, wherein the open celled foam occupies less than 50% of the total volume of the sorbent pad and wherein the pores of the open celled foam are smaller than the particles of the sorbent material.

2. A sorbent pad according to claim 1 in which the foam zones are all essentially spherical with substantially the same diameter.

3. A sorbent pad according to claim 1 in which the foam zones are randomly dispersed in the pad.

4. A sorbent pad according to claim 1 in which the foam zones are made from a polyvinyl chloride polymer.

5. A sorbent pad according to claim 1 having sections in which the sorbent in the pad will be depleted at different rates, and an indicator means affixed to the outflow surface of the pad to provide a visual indication of the state of depletion of the sorbent material in the pad.

6. A sorbent pad according to claim 1 in which the foam zones have shapes selected from spheres, cylinders, cubes, and irregular shapes.

7. A sorbent pad according to claim 1 in which the sorbent material contains a material that chemically changes an undesirable gas into an acceptable product.

8. A sorbent pad according to claim 1 in which the sorbent material is selected from active forms of alumina, silica, and carbon.

9. A filtration system comprising a housing and sealed within said housing a sorbent pad according to claim 1 and a particulate filter.

10. A sorbent pad for removing undesirable components from a gas flow comprising an activated alumina sorbent material and dispersed within said sorbent material a plurality of spheres in a rigid open celled polymer foam such that a line through the thickness of the pad and in the direction of air flow through the pad would intersect such foam spheres such that up to 50% of length of such line would be within said spheres, wherein the open celled foam occupies less than 50% of the total volume of the sorbent pad and wherein the pores of the open celled foam are smaller than the particles of the sorbent material.

11. A filtration system comprising a housing and sealed within said housing a sorbent pad according to claim 10 and a particulate filter.

12. A sorbent pad having opposed inflow and outflow surfaces, said pad comprising a sorbent material and dispersed within said sorbent material a plurality of zones of an open celled foam that together occupy from one-eighth to one-half of the local thickness of the pad between said inflow and outflow surfaces, wherein the pad further includes sections in which the sorbent in the pad will be depleted at different rates and an indicator means affixed to the outflow surface of the pad to provide a visual indication of the state of depletion of the sorbent material in the pad.

* * * * *